United States Patent
Matsubayashi

(10) Patent No.: US 8,331,432 B2
(45) Date of Patent: Dec. 11, 2012

(54) TRANSMITTING APPARATUS, TRANSMITTING METHOD, RECEIVING APPARATUS, RECEIVING METHOD, AND TRANSMITTING AND RECEIVING SYSTEM

(75) Inventor: Kei Matsubayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1704 days.

(21) Appl. No.: 11/705,137

(22) Filed: Feb. 12, 2007

(65) Prior Publication Data

US 2008/0074545 A1    Mar. 27, 2008

(30) Foreign Application Priority Data

Feb. 13, 2006    (JP) ................. 2006-034762

(51) Int. Cl.
*H04N 11/02* (2006.01)
(52) U.S. Cl. ............. 375/240; 375/E7.024; 348/552
(58) Field of Classification Search ............. 375/240, 375/240.02, E7.024; 348/552
See application file for complete search history.

(56) References Cited

FOREIGN PATENT DOCUMENTS

| JP | 2004-104416 | 2/2004 |
|---|---|---|
| JP | 2004-104416 | 4/2004 |
| JP | 2004-194294 | 8/2004 |
| JP | 2005-006339 | 1/2005 |
| JP | 2005-124193 | 12/2005 |
| WO | WO 2005-043784 | 12/2005 |

OTHER PUBLICATIONS

Ministry of Internal Affairs and Communications, Information Communication Counsel, Second Intermediate Report, [online], Jul. 29, 2005, Internet <http://www.soumu.go.jp/s-news/2005/050729_11.html>.

*Primary Examiner* — Thanhnga B Truong
(74) *Attorney, Agent, or Firm* — Finnegan, Henderson, Farabow, Garrett & Dunner LLP

(57) ABSTRACT

A transmitting and receiving system includes a transmitting apparatus that delivers a main stream for performing a streaming broadcast and an auxiliary stream generated from the main stream and a receiving apparatus that receives the main stream and the auxiliary stream from the transmitting apparatus. The transmitting apparatus includes a main-stream storing unit, a bit-rate-reducing converting unit, an auxiliary-stream storing unit, and a delivery control unit. The receiving apparatus includes a main-stream-reception control unit, an auxiliary-stream-reception control unit, a data processing unit, and an inter-stream-error storing unit. When tuning operation by a user is received, the main-stream-reception control unit selects, from data of an auxiliary stream of a tuned broadcast, data at such a time that the auxiliary stream is possible to be switched to a main stream without shift of scenes when the auxiliary stream is switched to the main stream later and supplies the data to the data processing unit.

4 Claims, 10 Drawing Sheets

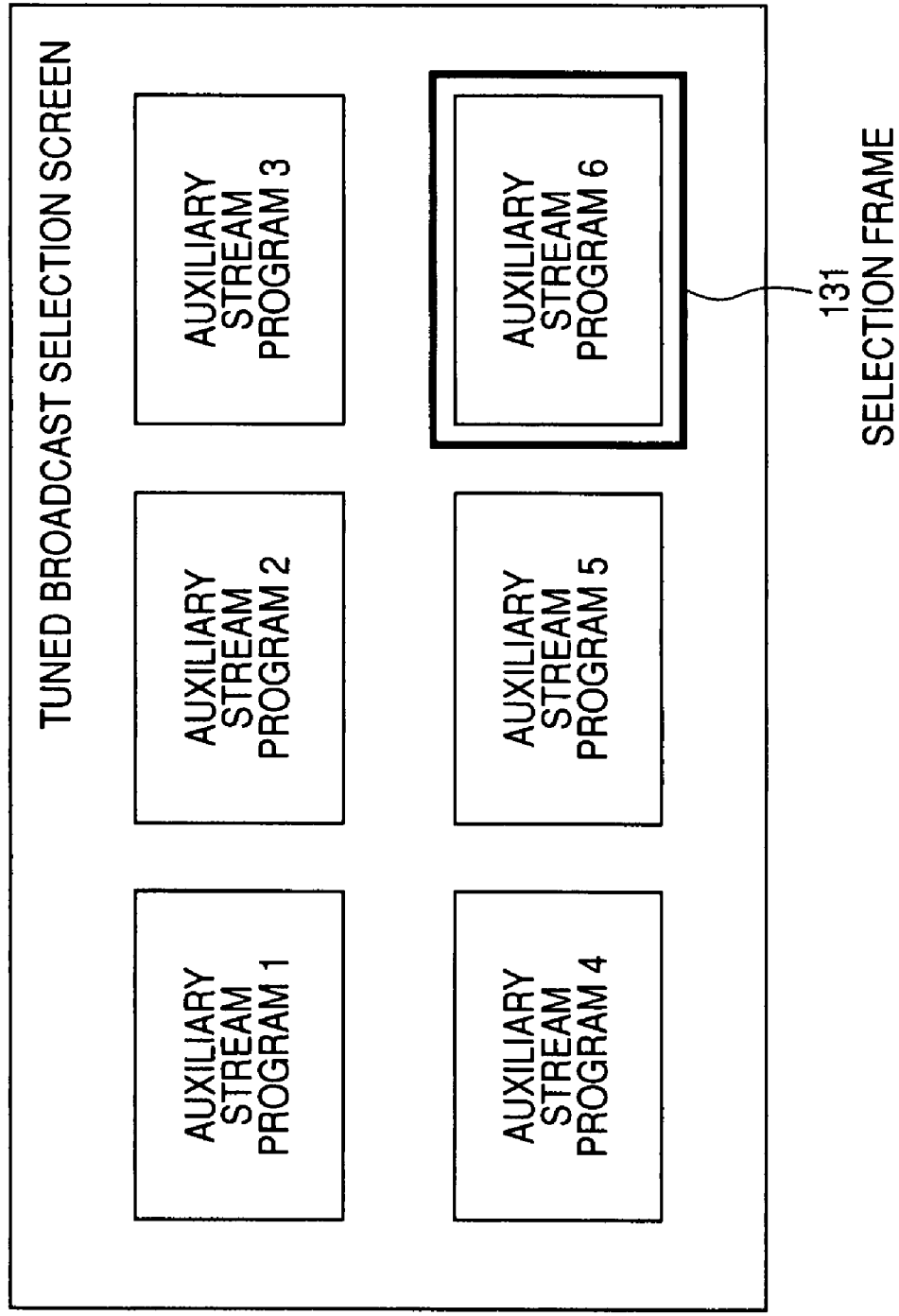

TRANSMITTING APPARATUS, TRANSMITTING METHOD, RECEIVING APPARATUS, RECEIVING METHOD, AND TRANSMITTING AND RECEIVING SYSTEM

CROSS-REFERENCES TO RELATED APPLICATIONS

The present invention contains subject matter related to Japanese Patent Application JP 2006-034762 filed in the Japanese Patent Office on Feb. 13, 2006, the entire contents of which being incorporated herein by reference.

BACKGROUND OF THE INVENTION

1. Field of the Invention

The present invention relates to a transmitting apparatus, a transmitting method, a receiving apparatus, a receiving method, and a transmitting and receiving system, and, more particularly to a stream transmitting apparatus, a stream transmitting method, a stream receiving apparatus, a stream receiving method, and a stream transmitting and receiving system for performing program change (tuning operation) at high speed when a streaming broadcast is received.

2. Description of the Related Art

The terrestrial digital broadcasting has started in Japan. As measures for areas having difficulty in viewing programs aiming at spread and promotion of the terrestrial digital broadcasting, besides the broadcasting satellite, retransmission by IP (Internet Protocol) multicast has been examined (see Ministry of Internal Affairs and Communications, Information Communication Council, Second Intermediate Report, [online], 2005/Jul./29, Internet <http://www.soumu.go.jp/s-news/2005/050729_11.html>. When the terrestrial digital broadcasting is retransmitted by the IP multicast, a user receives and views a streaming broadcast using a television receiver and a video recorder in the same manner as viewing the streaming broadcast using a PC (personal computer) under the present situation.

In general, in the streaming broadcast, data is compressed using a compression technique similar to MPEG (Moving Picture Expert Group). Each of screens of a video stream includes screen data compressed in the screen itself (in FIG. 1 and the following explanation, as in MPEG, the screen data is referred to as I picture) and screen data compressed using reference to screens other than the screen and a difference between the screen and the other screens (in FIG. 1 and the following explanation, as in MPEG, the screen data is referred to as P picture and B picture).

When the streaming broadcast is received on a reception side, it is possible to perform decompression processing to decompress the I picture itself into one screen. However, it is difficult to perform decompression processing for the screens other than the I picture when there is no I picture. Thus, in the streaming broadcast, even if reception is started on the reception side at time T1, when a screen other than the I picture is received, for example, when a B picture 21 shown in FIG. 1 is received, it may be impossible to start processing for display until an I picture 24 is received. As a result, display start time is from time T2.

Alternatively, a transmitting apparatus (a server) performs control to start delivery from the I picture (e.g., an I picture 16 in FIG. 1) in response to a delivery request. This makes it unnecessary to wait for reception of the I picture on the reception side.

In the streaming broadcast, video data is transmitted to a receiving apparatus using an IP network. As the IP network, an FTTH (Fiber to The Home) or the like is used up to a home and a facility and a wire LAN (Local Area Network) such as the Ethernet (registered trademark) or a wireless LAN is used in the home and the facility.

The FTTH, the ADSL (Asymmetric Digital Subscriber Line), the Ethernet (registered trademark), and the like are networks of the best-effort type in which a maximum value of communication speed is indicated but is not always guaranteed and speed may suddenly fall due to occurrence of congestion. Therefore, if there is a network of the best-effort type at least in a part of a network between a streaming broadcast delivery server and a reception terminal, communication speed is not guaranteed and temporary fall in the communication speed is inevitable. Thus, in a terminal that receives the streaming broadcast, to prevent a broadcast from being suspended even if communication is interrupted, the broadcast is played after storing (buffering) a fixed quantity of data of a video stream in a storage device or the like (hereinafter referred to as buffer).

SUMMARY OF THE INVENTION

However, in the streaming broadcast, when a channel of a broadcast is changed (hereinafter referred to as "tuning" in the streaming broadcast as well), it takes time to display a broadcast of a channel after the change.

One cause is that, when a screen other than the I picture is received at the time of channel change, it is necessary to wait for the I picture. This means that, in the case of the terrestrial digital broadcasting, when I pictures are arranged at every 0.5 second of a program (a value at the time when a GOP (a series of pictures from an I picture to the next I picture) illustrated in the ARIB (Association of Radio Industries and businesses) standard STD-B32 is fifteen pictures and display is performed at 30 Hz), a maximum delay of 0.5 second occurs.

It is possible to substantially eliminate the delay by delivering the program from the I picture when a delivery request is received by a server. However, since it is necessary to deliver a video stream in unicast every time the delivery request is received, this is unrealistic not only in terms of delivery costs but also in terms of a data amount on a network when the number of streams delivered is taken into consideration. In this case, even if requests are collectively delivered in multicast, for example, at every 0.1 second to reduce the delay to 0.1 second, since five streams are necessary in 0.5 second, burdens on the delivery-server side increases by five-fold.

Another cause is that buffering is performed. As shown in FIG. 2, a receiving apparatus (a reception side) performs tuning operation at time T1, performs a delivery request to wait for reception or participates in a multicast group, and receives data of a main stream. FIG. 2 shows a system for performing a delivery request to wait for reception (unicast). Even if the receiving apparatus immediately starts to receive the data, when it may be impossible to decode and display the data because an I picture or the like referred to by the data has already been transmitted and it is difficult to acquire the I picture or the like, it may be impossible to use the data later. Thus, when decodable data arrives later at time T4 later than time T1, storage of the data in a buffer on the reception side is started. The buffering is completed at time T5. Display in the receiving apparatus is started at time T6 later than time T5.

It is necessary to increase a capacity of the buffer to better prepare for network failure. For example, if buffering is performed for one second or more assuming that communication is interrupted for one second, a user waits for display for one second or more.

As described above, in the streaming broadcast in the past, since tuning operation takes time, the user is kept waited for a long time to be embarrassed and feels uneasiness about failure. Besides, viewability of the user is limited to a state in which it is difficult for the user to take a viewing form for watching various programs to search for a favorite program. Since a buffering time is unreasonably set short, a broadcast may be suspended because of slight network failure and the user is embarrassed.

Thus, for example, JP-A-2004-104416 proposes a method of preparing a video stream serving as a digest of a video stream and, when a user likes a program and selects viewing of the program while the user plays digest videos of programs one after another, since buffering for the video stream is started at the start of the digest play, quickly switching the digest to the video stream.

However, in this method, since the user has to watch the digest video always, the user is restricted from usual channel selection, for example, the user unwillingly watches a scene ahead. When the user selects viewing of a program simultaneously with start of the digest video, the user needs to wait during the buffering.

Further, for example, JP-A-2005-6339 proposes a method of preparing, instead of waiting for the next I picture when a GOP (Group Of Pictures) is received from the middle, one or more alternative data starting from an I picture temporally staggered during a GOP by, for example, reducing a bit rate of an original video stream, and providing an alternative stream closest to a delivery request to reduce waiting for an I picture.

However, in this method, even if the original video stream is requested, it is still necessary to at least wait during communication time until the alternative stream arrives and during the buffering. Further, in this method, display is switched from the alternative stream with the I picture of the original video stream as an opportunity. However, when time necessary for the buffering is different in both the streams that are likely to use different bandwidths, it is likely to be difficult to maintain continuity of scenes in the switching of display.

Therefore, it is desirable to realize unlimitedly fast tuning operation in a terminal that receives a streaming broadcast.

According to an embodiment of the invention, there is provided a transmitting and receiving system including a transmitting apparatus that delivers a main stream for performing a streaming broadcast and an auxiliary stream generated from the main stream and a receiving apparatus that receives the main stream and the auxiliary stream from the transmitting apparatus. The transmitting apparatus includes main-stream storing means for storing the main stream, bit-rate-reducing converting means for reducing a bit rate of the main stream to generate an auxiliary stream, auxiliary-stream storing means for storing the auxiliary stream, and delivery control means for performing control for delivering the main stream stored in the main-stream storing means and the auxiliary stream stored in the auxiliary-stream storing means to a network through a network interface. The receiving apparatus includes main-stream-reception control means for controlling reception of the main stream and storage of the main stream in a buffer, auxiliary-stream-reception control means for controlling reception of the auxiliary stream and storage of the auxiliary stream in a buffer, data processing means for performing decoding processing, decompression processing, and video processing for the main stream and the auxiliary stream, and inter-stream-error storing means for judging an error between scenes of the main stream and the auxiliary stream on the basis of a value designating display time of each of screens and storing the error. When tuning operation by a user is received, the main-stream-reception control means selects, from data of an auxiliary stream of a tuned broadcast, reception and storage of which are controlled by the auxiliary-stream-reception control means, data at such a time that the auxiliary stream is possible to be switched to a main stream without shift of scenes when the auxiliary stream is switched to the main stream later, taking into account the error stored in the inter-stream-error storing means, and supplies the data to the data processing means.

According to the embodiment, there is provided a transmitting apparatus including main-stream storing means for storing a main stream for performing a streaming broadcast, bit-rate-reducing converting means for converting the main stream into an auxiliary stream of a low bit rate, auxiliary-stream storing means for storing the auxiliary stream, and delivery control means for performing, in response to a delivery request inputted from a network interface, control for delivering the main stream stored in the main-stream storing means and the auxiliary stream stored in the auxiliary-stream storing means to a network through the network interface.

According to the embodiment, there is provided a transmitting method including the steps of controlling storage of a main stream for performing a streaming broadcast, converting the main stream into an auxiliary stream of a low bit rate, controlling storage of the auxiliary stream, and performing, in response to a delivery request inputted from a network interface, control for delivering the main stream, storage of which is controlled in the main-stream-storage control step, and the auxiliary stream, storage of which is controlled in the auxiliary-stream-storage control step, to a network through the network interface.

In the transmitting apparatus and the transmitting method, the main stream is stored, the auxiliary stream set to a bit rate lower than that of the main stream is also stored, and delivery of the main stream and the auxiliary stream stored is controlled.

According to another embodiment of the invention, there is provided a transmitting and receiving system including a first transmitting apparatus that delivers a main stream for performing a streaming broadcast, a second transmitting apparatus that delivers an auxiliary stream generated from the main stream, and a receiving apparatus that receives the main stream from the first transmitting apparatus and the auxiliary stream from the second transmitting apparatus. The first transmitting apparatus includes main-stream storing means for storing the main stream and main-stream-delivery control means for performing control for delivering the main stream stored in the main-stream storing means to a network through a network interface. The second transmitting apparatus includes bit-rate-reducing converting means for receiving the main stream, reducing a bit rate of the main stream, and generating an auxiliary stream, auxiliary-stream storing means for storing the auxiliary stream, and auxiliary-stream-delivery control means for performing control for delivering the auxiliary stream stored in the auxiliary-stream storing means to the network through a network interface. The receiving apparatus includes main-stream-reception control means for controlling reception of the main stream and storage of the main stream in a buffer, auxiliary-stream-reception control means for controlling reception of the auxiliary stream and storage of the auxiliary stream in the buffer, data processing means for performing decoding processing, decompression processing, and video processing for the main stream and the auxiliary stream, and inter-stream-error storing means for judging an error between scenes of the main stream and the auxiliary stream on the basis of a value designating display time of each of screens and storing the error. When tuning operation by a user is received, the main-streamreception control means selects, from data of an auxiliary stream of a tuned broadcast, reception and storage of which are controlled by the auxiliary-stream-reception control means, data at such a time that the auxiliary stream is possible to be switched to a main stream without shift of scenes when the auxiliary stream is switched to the main stream later, taking into account the error stored in the inter-stream-error storing means, and supplies the data to the data processing means.

According to the embodiment, there is provided a transmitting apparatus including main-stream storing means for storing a main stream for performing a streaming broadcast and delivering means for delivering the main stream to an apparatus that reduces a bit rate of the main stream or a receiving apparatus that performs reproduction of the main stream.

According to the embodiment, there is provided a transmitting method including the steps of controlling storage of a main stream for performing a streaming broadcast and delivering the main stream to an apparatus that reduces a bit rate of the main stream or a receiving apparatus that performs reproduction of the main stream.

In the transmitting apparatus and the transmitting method, the main stream is stored and delivery of the main stream stored is controlled.

According to still another embodiment of the invention, there is provided a transmitting apparatus including bit-rate-reducing converting means for converting a main stream for performing a streaming broadcast supplied from another apparatus into an auxiliary stream of a low bit rate, auxiliary-stream storing means for storing the auxiliary stream, and delivery control means for performing, according to a delivery request inputted from a network interface, control for delivering the auxiliary stream stored in the auxiliary-stream storing means to a network through the network interface.

The delivery control means may deliver one stream obtained by collecting plural auxiliary streams as an auxiliary stream.

According to the embodiment, there is provided a transmitting method including the steps of converting a main stream for performing a streaming broadcast supplied from another apparatus into an auxiliary stream of a low bit rate, controlling storage of the auxiliary stream, and performing, according to a delivery request inputted from a network interface, control for delivering the auxiliary stream, storage of which is controlled in processing in the auxiliary-stream-storage control step, to a network through the network interface.

In the transmitting apparatus and the transmitting method, the auxiliary stream set to a bit rate lower than that of the main stream is generated and stored and delivery of the auxiliary stream stored is controlled.

According to still another embodiment of the invention, there is provided a receiving apparatus including main-stream-reception control means for controlling reception of a main stream for performing a streaming broadcast and storage of the main stream in a buffer, auxiliary-stream-reception control means for controlling reception of the auxiliary stream obtained by reducing a bit rate of the main stream and storage of the auxiliary stream in the buffer, data processing means for performing decoding processing, decompression processing, and video processing for the main stream and the auxiliary stream, and inter-stream-error storing means for judging an error between scenes of the main stream and the auxiliary stream on the basis of a value designating display time of each of screens and storing the error. When tuning operation by a user is received, the main-stream-reception control means performs a delivery request for a main stream of a tuned broadcast from a network interface and selects, from data of an auxiliary stream of the tuned broadcast, reception and storage of which are controlled by the auxiliary-stream-reception control means, data at such a time that the auxiliary stream is possible to be switched to a main stream without shift of scenes when the auxiliary stream is switched to the main stream later, taking into account the error stored in the inter-stream-error storing means, and supplies the data to the data processing means.

The receiving apparatus further includes scene detecting means for detecting a predetermined scene from an output of the data processing means. When the predetermined scene is detected by the scene detecting means, the receiving apparatus may apply a trigger to the auxiliary-stream-reception control means to request a transmitting apparatus that transmits an auxiliary stream to transmit the auxiliary stream and may cause the auxiliary-stream-reception control means to start buffering.

The receiving apparatus may always receive and store the auxiliary stream.

The receiving apparatus may receive auxiliary streams of all programs.

The receiving apparatus may receive an auxiliary stream of a program expected to be tuned in next from a program being viewed.

The receiving apparatus may receive auxiliary streams of plural broadcasts to be tuned in, simultaneously display images based on the auxiliary streams on a screen, and perform a delivery request for the main stream with positioning of a frame or an arrow indicating a selection candidate on the image as a trigger.

The data processing means may absorb shift of scenes in switching data of the auxiliary stream to data of the main stream by adjusting display time of a picture at a point before a first picture of the main stream at the time when the data of the auxiliary stream is switched to the data of the main stream.

According to the embodiment, there is provided a receiving method including the steps of controlling reception of a main stream for performing a streaming broadcast and storage of the main stream in a buffer, controlling reception of the auxiliary stream obtained by reducing a bit rate of the main stream and storage of the auxiliary stream in the buffer, performing decoding processing, decompression processing, and video processing for the main stream and the auxiliary stream, and judging an error between scenes of the main stream and the auxiliary stream on the basis of a value designating display time of each of screens and storing the error. When tuning operation by a user is received, in the main-stream-reception control step, a delivery request for a main stream of a tuned broadcast is performed from a network interface and, from data of an auxiliary stream of the tuned broadcast, reception and storage of which are controlled in the auxiliary-stream-reception control step, data at such a time that the auxiliary stream is possible to be switched to a main stream without shift of scenes when the auxiliary stream is switched to the main stream later is selected taking into account the error stored in the inter-stream-error storing means and transferred to the data processing step.

In the receiving apparatus and the receiving method, the auxiliary stream of a bit rate lower than that of the main stream is received and stored earlier than the main stream. When tuning is instructed, taking into account the error stored, an auxiliary stream at such a time that the auxiliary stream is switched to a main stream without shift of scenes when the auxiliary stream is switched to the main stream later.

According to an embodiment of the invention, at the time of tuning, it is possible to reduce time during which an image is not provided to a user.

BRIEF DESCRIPTION OF THE DRAWINGS

FIG. 10 is a diagram showing a UI according to an embodiment of the invention.

DESCRIPTION OF THE PREFERRED EMBODIMENTS

Figure 1:
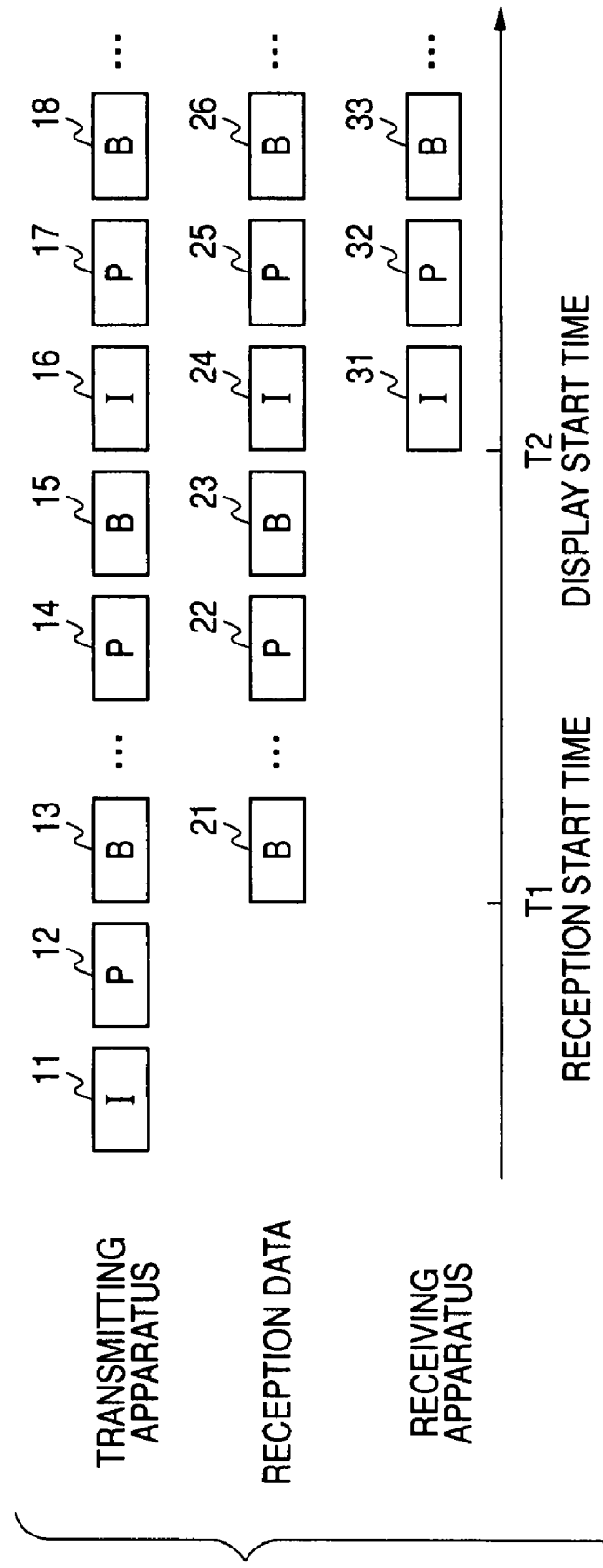
FIG. 1 is a diagram showing an example of general reception timing and display timing of compressed image data including I pictures.
Figure 2:
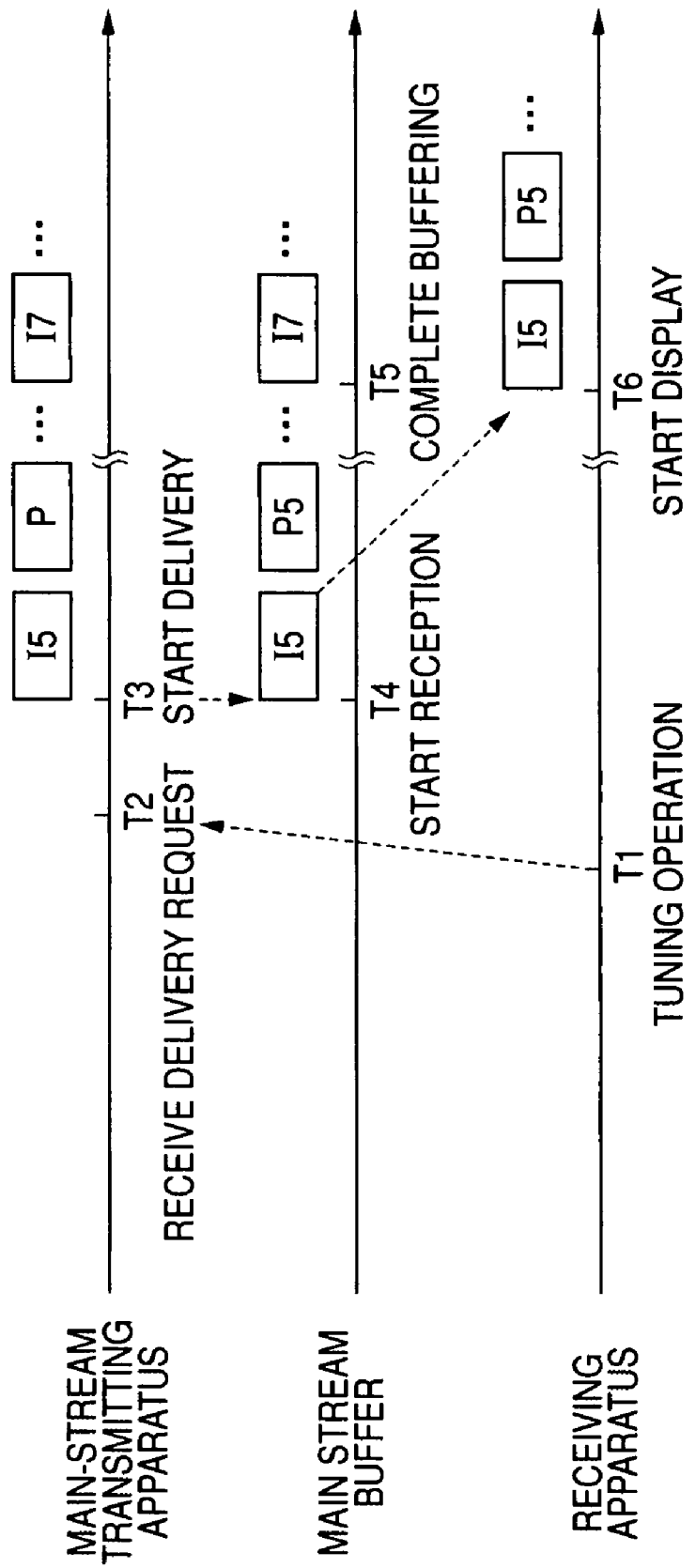
FIG. 2 is a diagram showing an example of a temporal relation among a streaming delivery request, buffering, and screen display in the past.

Embodiments of the invention will be hereinafter explained. An example of a correspondence relation between elements of the invention and embodiments described or shown in the specification or the drawings is as described below. This description is a description for confirming that the embodiments supporting the invention are described or shown in the specification or the drawings. Therefore, even if there is an embodiment described or shown in the specification or the drawings but not described here as an embodiment corresponding to an element of the invention, this does not means that the embodiment does not correspond to the element. On the other hand, even if an embodiment is described here as an embodiment corresponding to an element, this does not means that the embodiment does not correspond to elements other than the element.

According to an embodiment of the invention, there is provided a transmitting and receiving system including a transmitting apparatus (e.g., a transmitting apparatus 11 in FIG. 5) that delivers a main stream for performing a streaming broadcast and an auxiliary stream generated from the main stream and a receiving apparatus (e.g., a receiving apparatus 12 in FIG. 5) that receives the main stream and the auxiliary stream from the transmitting apparatus. The transmitting apparatus includes main-stream storing means (e.g., a main-stream storing unit 21 in FIG. 5) for storing the main stream, bit-rate-reducing converting means (e.g., a bit-rate-reducing converting unit 22 in FIG. 5) for reducing a bit rate of the main stream to generate an auxiliary stream, auxiliary-stream storing means (e.g., an auxiliary-stream storing unit 23 in FIG. 5) for storing the auxiliary stream, and delivery control means (e.g., a delivery control unit 24 in FIG. 5) for performing control for delivering the main stream stored in the main-stream storing means and the auxiliary stream stored in the auxiliary-stream storing means to a network through a network interface. The receiving apparatus includes main-stream-reception control means (e.g., a main-stream-reception control unit 39 in FIG. 5) for controlling reception of the main stream and storage of the main stream in a buffer, auxiliary-stream-reception control means (an auxiliary-stream-reception control unit 40 in FIG. 5) for controlling reception of the auxiliary stream and storage of the auxiliary stream in a buffer, data processing means (a data processing unit 35 in FIG. 5) for performing decoding processing, decompression processing, and video processing for the main stream and the auxiliary stream, and inter-stream-error storing means (e.g., an inter-stream-error storing unit 34 in FIG. 5) for judging an error between scenes of the main stream and the auxiliary stream on the basis of a value designating display time of each of screens and storing the error.

According to another embodiment of the invention, there is provided a transmitting apparatus (e.g., the transmitting apparatus 11 in FIG. 5) including main-stream storing means (e.g., the main-stream storing unit 21 in FIG. 5) for storing a main stream for performing a streaming broadcast, bit-rate-reducing converting means (e.g., the bit-rate-reducing converting unit 22 in FIG. 5) for converting the main stream into an auxiliary stream of a low bit rate, auxiliary-stream storing means (e.g., the auxiliary-stream storing unit 23 in FIG. 5) for storing the auxiliary stream, and delivery control means (e.g., the delivery control unit 24 in FIG. 5) for performing, according to a delivery request inputted from a network interface, control for delivering the main stream stored in the main-stream storing means and the auxiliary stream stored in the auxiliary-stream storing means to a network through the network interface.

Figure 5:
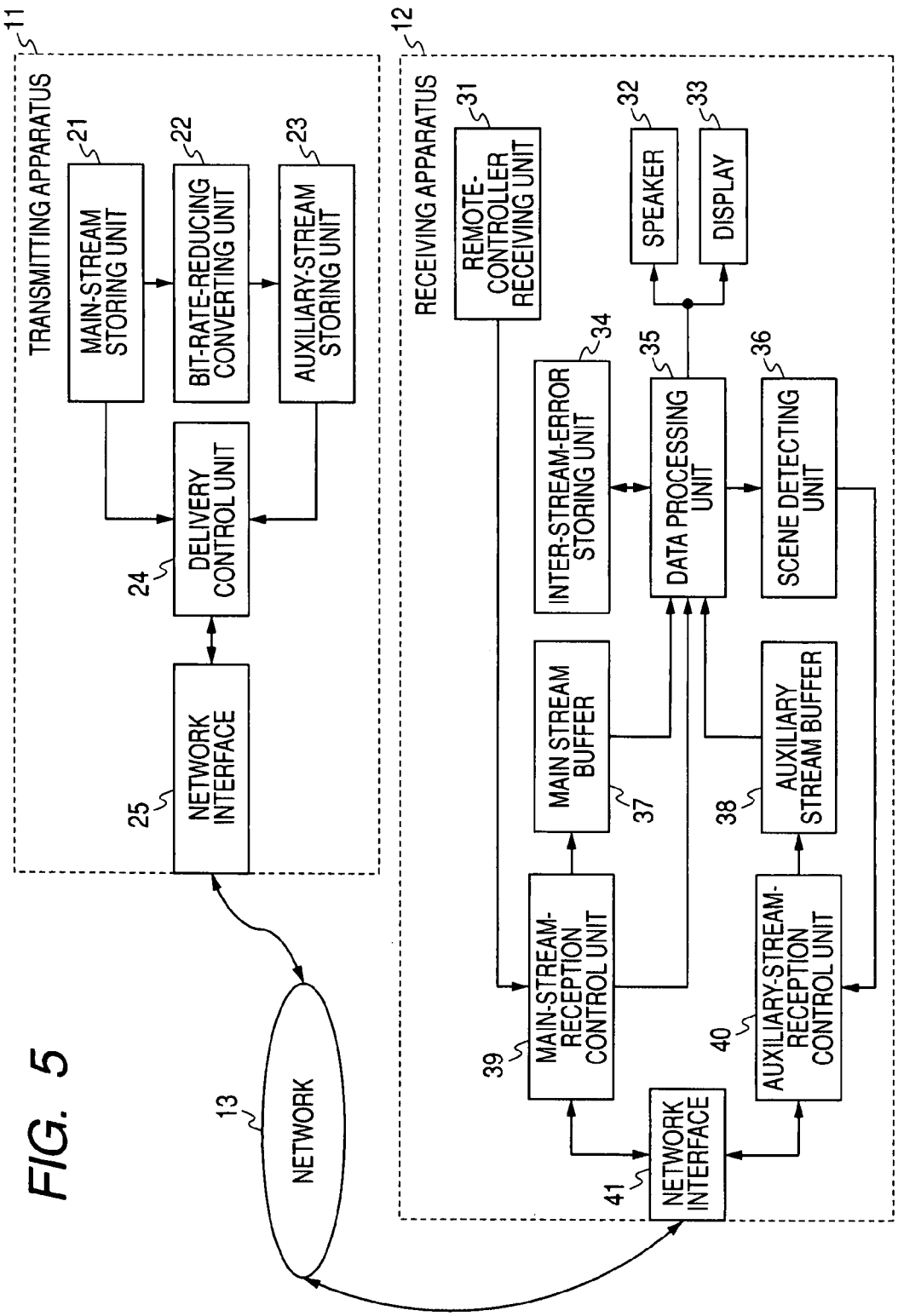
FIG. 5 is a diagram showing structures of a transmitting apparatus and a receiving apparatus according to an embodiment of the invention.

According to still another embodiment of the invention, there is provided a transmitting and receiving system including a first transmitting apparatus (a main-stream transmitting apparatus 101-1 in FIG. 9) that delivers a main stream for performing a streaming broadcast, a second transmitting apparatus (e.g., an auxiliary-stream transmitting apparatus 110 in FIG. 9) that delivers an auxiliary stream generated from the main stream, and a receiving apparatus (e.g., the receiving apparatus 12 in FIG. 5 (FIG. 9)) that receives the main stream from the first transmitting apparatus and the auxiliary stream from the second transmitting apparatus. The first transmitting apparatus includes main-stream storing means (e.g., a main-stream storing unit 102-1 in FIG. 9) for storing the main stream and main-stream-delivery control means (e.g., a delivery control unit 103-1 in FIG. 9) for performing control for delivering the main stream stored in the main-stream storing means to a network through a network interface. The second transmitting apparatus includes bit-rate-reducing converting means (e.g., a bit-rate-reducing converting unit 113-1 in FIG. 9) for receiving the main stream, reducing a bit rate of the main stream, and generating an auxiliary stream, auxiliary-stream storing means (e.g., an auxiliary-stream storing unit 114-1 in FIG. 9) for storing the auxiliary stream, and auxiliary-stream-delivery control means (e.g., a delivery control unit 112 in FIG. 9) for performing control for delivering the auxiliary stream stored in the auxiliary-stream storing means to the network through a network interface. The receiving apparatus includes main-stream-reception control means (e.g., the main-stream-reception control unit 39 in FIG. 5) for controlling reception of the main stream and storage of the main stream in a buffer, auxiliary-stream-reception control means (e.g., the auxiliary-stream-reception control unit 40 in FIG. 5) for controlling reception of the auxiliary stream and storage of the auxiliary stream in the buffer, data processing means (e.g., the data processing unit 35 in FIG. 5) for performing decoding processing, decompression processing, and video processing for the main stream and the auxiliary stream, and inter-stream-error storing means (e.g., the inter-stream-error storing unit 34 in FIG. 5) for judging an error between scenes of the main stream and the auxiliary stream on the basis of a value designating display time of each of screens and storing the error.

According to still another embodiment of the invention, there is provided a transmitting apparatus (e.g., the main-stream transmitting apparatus 101-1 in FIG. 9) including main-stream storing means (e.g., the main-stream storing unit 102-1 in FIG. 9) for storing a main stream for performing a streaming broadcast and delivery control means (e.g., the delivery control unit 103-1 in FIG. 9) for delivering the main stream stored in the main-stream storing means to an apparatus that reduces a bit rate of the main stream and a receiving apparatus that performs reproduction of the main stream, the apparatus and the receiving apparatus being connected to a network through a network interface.

According to still another embodiment of the invention, there is provided a transmitting apparatus (e.g., the auxiliary-stream transmitting apparatus 110 in FIG. 9) including bit-rate-reducing converting means (e.g., the bit-rate-reducing converting unit 113-1 in FIG. 9) for converting a main stream for performing a streaming broadcast supplied from another apparatus into an auxiliary stream of a low bit rate, auxiliary-stream storing means (e.g., the auxiliary-stream storing unit 114-1 in FIG. 9) for storing the auxiliary stream, and delivery control means (e.g., the delivery control unit 112 in FIG. 9) for performing, according to a delivery request inputted from a network interface, control for delivering the auxiliary stream stored in the auxiliary-stream storing means to a network through the network interface.

According to still another embodiment of the invention, there is provided a receiving apparatus (e.g., the receiving apparatus 12 in FIG. 5) including main-stream-reception control means (e.g., the main-stream-reception control unit 39 in FIG. 5) for controlling reception of a main stream for performing a streaming broadcast and storage of the main stream in a buffer, auxiliary-stream-reception control means (e.g., the auxiliary-stream-reception control unit 40 in FIG. 5) for controlling reception of the auxiliary stream obtained by reducing a bit rate of the main stream and storage of the auxiliary stream in the buffer, data processing means (e.g., the data processing unit 35 in FIG. 5) for performing decoding processing, decompression processing, and video processing for the main stream and the auxiliary stream, and inter-stream-error storing means (e.g., the inter-stream-error storing unit 34 in FIG. 5) for judging an error between scenes of the main stream and the auxiliary stream on the basis of a value designating display time of each of screens and storing the error.

Embodiments of the invention will be hereinafter explained. First, outlines of the embodiments of the invention will be explained.

In a streaming broadcast, a compression technique similar to MPEG (Moving Picture Expert Group) is used. Decoding processing has to be performed from a picture (an I picture in MPEG) in which it is possible to start decoding on a screen itself of the picture. In order to prevent a broadcast from being suspended because of network failure, display is performed after storing (buffering) a fixed amount of data. Thus, in the method in the past, when a channel of the streaming broadcast is changed (hereinafter referred to as "tuning" in the streaming broadcast as well), it takes time to display a tuned broadcast.

In the embodiments of the invention explained below, for a video stream for performing a streaming broadcast (hereinafter referred to as main stream), a video stream obtained by reducing a bit rate of the main stream (hereinafter referred to as auxiliary stream) is prepared. Since the auxiliary stream is low in load because of its low bit rate, for example, the auxiliary stream may be received always. In this case, when tuning operation is performed, the main stream is instantaneously switched to the auxiliary stream and, when buffering for the main stream is completed, the auxiliary stream is switched to the main stream.

Specifically, a video stream of a low bit rate (an auxiliary stream) is prepared as a substitute for a video stream of a broadcast program to be distributed (a main stream). This auxiliary stream is a stream obtained by converting the main stream according to a method of, for example, reducing a screen size of the main stream, reducing the number of bits representing luminance or chromaticity forming a video, curtailing the number of display frames to reduce the number of screens in a time axis direction, or reducing the number of channels of sound.

Concerning delivery of this auxiliary stream, broadcasting stations may deliver the auxiliary stream together with the main stream or deliver the main stream and the auxiliary stream separately.

On the reception side, an auxiliary stream of a program likely to be tuned in is received prior to tuning operation. The program likely to be tuned in may be an individual program such as an adjacent program tuned in by operation such as an up/down key of a remote controller, an adjacent program in a program list displayed in an UI (User Interface), or a program estimated from a viewing history or may be the all programs that can be received in other regions.

Since the program is received prior to the tuning operation, on the reception side, the auxiliary stream may be received always or may be received on the basis of some phenomenon such as start of reception according to automatic scene detection of, for example, the beginning of a CM (commercial) that is one timing when tuning is performed.

When the tuning operation is performed on the reception side, the main stream is switched to the auxiliary stream to be tuned in. At this point, a black screen in a short time may be interposed to let a viewer know that a program is switched or a program may be instantaneously switched.

On the reception side, with the tuning operation or operation related to the tuning operation such as tuning candidate selection as an opportunity, reception is started by performing a delivery request for a main stream to be tuned in or participating in a multicast group of the main stream to be tuned in and buffering is started by storing data from the time when data that can be displayed later arrives. When the buffering is completed, a video is switched from the auxiliary stream to the main stream. At this point, for convenience of the transmission side or convenience of the buffering on the reception side, it is likely that scenes are shifted between both the streams. Thus, the video is switched with the scenes matched. The switching of the video may be performed by increasing or reducing reproduction frame speed even if the scenes are not joined in a strict sense.

In order to match the scenes in this way, timing for displaying each compressed frame such as a PTS (Presentation Time Stamp) in MPEG after decoding the compressed frame is recorded in the main stream and the auxiliary frame. On the reception side, both the streams are received and an error of the timing is detected and stored as processing in the receiving apparatus even if the video is not displayed on the screen prior to the tuning operation.

This makes it possible to instantaneously display, on the reception side, a program after change, although a video is not complete because of a low resolution or the like, and perform the tuning operation at high speed without waiting for the buffering for the main stream when the channel changing operation is performed as in the past. Thus, the viewer is capable of viewing various programs without feeling stress.

Figure 3:
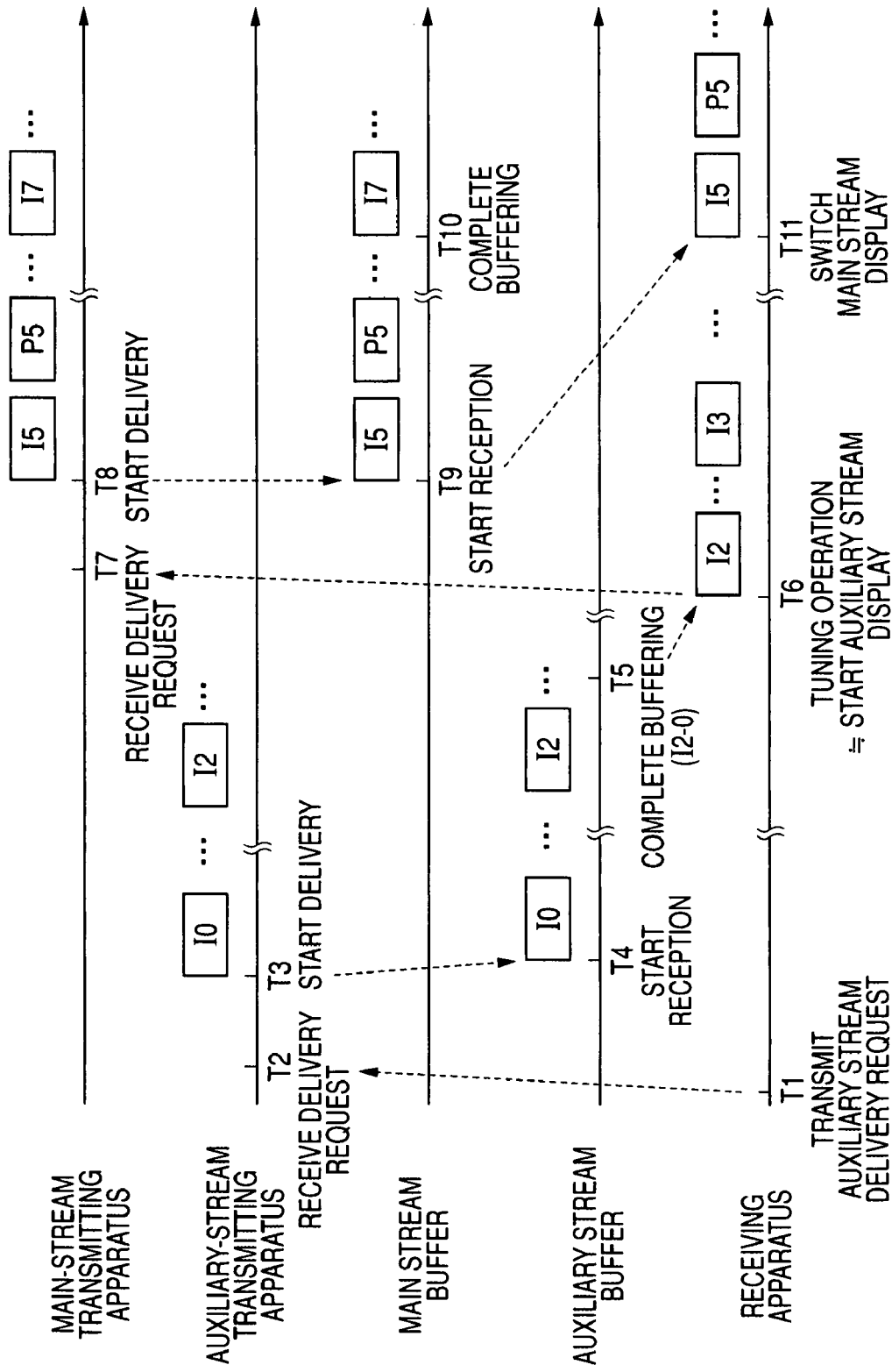
FIG. 3 is a diagram showing a temporal relation among a streaming delivery request, buffering, and screen display in unicast according to an embodiment of the invention.

A temporal relation among operations of buffers of a transmitting apparatus (a transmission side) and a receiving apparatus (a receiving side) and a display device on the reception side such as a display is shown as an example in FIG. 3 to explain that tuning is performed at high speed. The example shown in FIG. 3 indicates the temporal relation at the time when it is assumed that unicast is performed.

When the display device transmits a delivery request for an auxiliary stream at time T1, the transmitting apparatus that transmits the auxiliary stream receives the request at time T2 and delivers data I0 at time T3. When the receiving apparatus receives the data I0 at time T4, the receiving apparatus stores the data I0 in a buffer for the auxiliary stream as the data I0. Data are sequentially received on the reception side in the same manner. In a short time after the reception of the respective data (e.g., data I2), buffering is completed to the extent that the data may be displayed (time T5 in the case of the data I2).

When tuning operation is performed at time T6, it is possible to immediately display the data I2 as the data I2 because the buffering is completed (time T6). At time T6, the receiving apparatus transmits a delivery request to the transmitting apparatus that transmits a main stream. The transmitting apparatus receives the delivery request at time T7 and starts delivery of data from data I5 at time T8.

The receiving apparatus receives the data started to be delivered at time T8 and stores the data in a buffer for the main stream as the data I5 at time T9. At a stage when the buffering is completed (time T10), the display device switches display from the auxiliary stream to the main stream (time T11).

As described above, in the past, from time T6 when the tuning operation is performed until time T11 when the buffering for the main stream is finished and the display is started, a user is not provided with a screen. However, according to this embodiment, it is possible to provide the user with a screen substantially simultaneously with time T6 when the tuning operation is performed.

Figure 4:
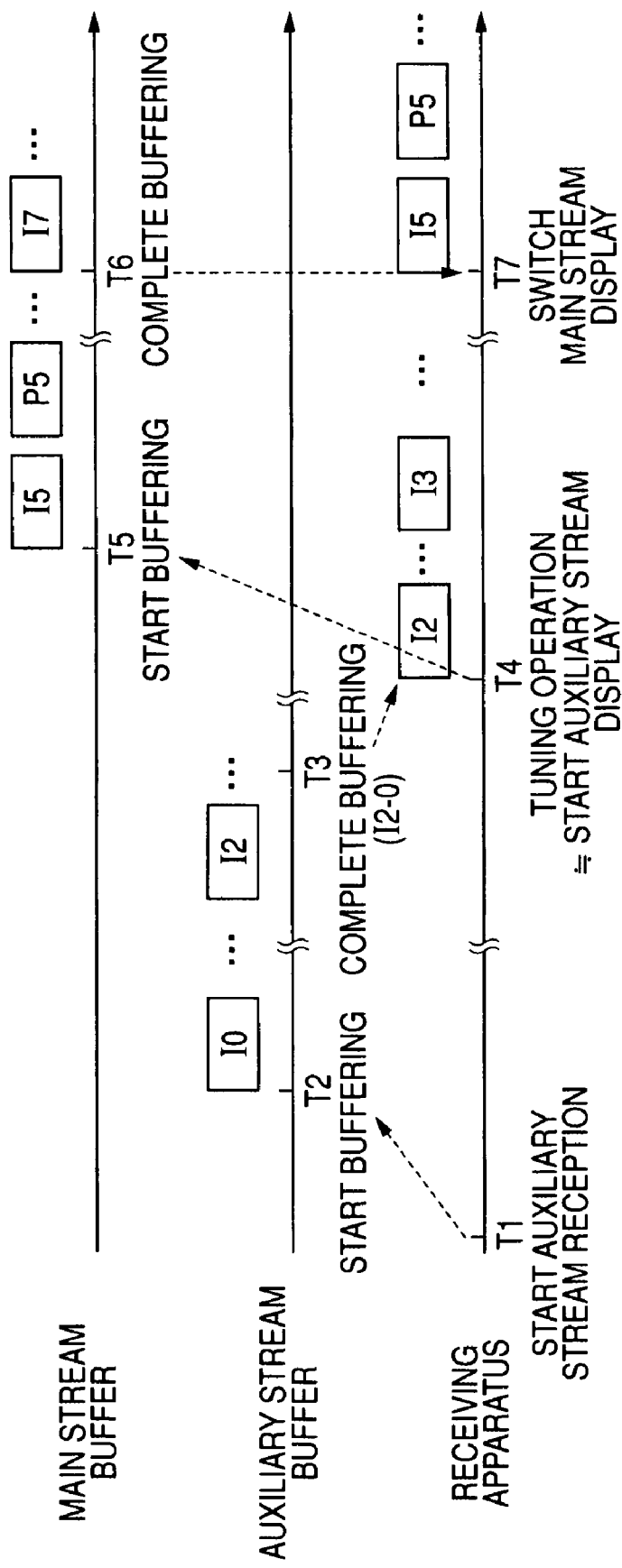
FIG. 4 is a diagram showing an example of a temporal relation among a streaming delivery request, buffering, and screen display in multicast according to the embodiment.

A temporal relation among operations in the buffer of the receiving apparatus and the display unit on the reception side such as a display is shown as an example in FIG. 4 to explain that tuning is performed at high speed. The example shown in FIG. 4 indicates the temporal relation at the time when it is assumed that multicast is performed.

At time T1, when the receiving apparatus starts reception of an auxiliary stream, the receiving apparatus receives a packet of the auxiliary stream by participating in a multicast group and, at time T2 when data I0 that can be decoded and displayed later arrives, stores the data I0 in the buffer for the auxiliary stream as the data I0 to start buffering. Data are sequentially received on the reception side in the same manner. In a short time after the reception of the respective data (e.g., data I2), the buffering is completed to the extent that the data may be displayed (time T3 in the case of the data I2).

When tuning operation is performed at time T4, it is possible to immediately display the data I2 as the data I2 because the buffering is completed (time T4). At the same time, at time T5, the receiving apparatus receives a packet of a main stream by participating in a multicast group of the main stream and, at time T5 when data I5 that can be decoded and displayed later arrives, stores the data I5 in the buffer for the main stream as the data I5 to start buffering.

At a stage when the buffering is completed (time T6), the display device switches display from the auxiliary stream to the main stream (time T7).

In the past, from time T4 when the tuning operation is performed until time T7 when the buffering for the main stream is finished and the display is started, a user is not provided with a screen. However, according to this embodiment, it is possible to provide the user with a screen substantially simultaneously with time T4 when the tuning operation is performed.

Embodiments for realizing the above will be hereinafter explained.

First Embodiment

FIG. 5 is a block diagram of a structure of a system according to a first embodiment of the invention. In the block diagram, a streaming broadcast is delivered from a transmitting apparatus to a receiving apparatus through a network and displayed. The system shown in FIG. 5 includes a transmitting apparatus 11 that transmits a main stream and an auxiliary stream, a receiving apparatus 12 that receives the main stream and the auxiliary stream from the transmitting apparatus 11, and a network 13 through which the transmitting apparatus 11 and the receiving apparatus 12 are connected.

The transmitting apparatus 11 includes a main-stream storing unit 21, a bit-rate-reducing converting unit 22, an auxiliary-stream storing unit 23, a delivery control unit 24, and a network interface 25.

In the transmitting apparatus 11, data forming a main stream recorded in the main-stream storing unit 21 is inputted to the bit-rate-reducing converting unit 22. A result of reducing a bit rate of the main stream is stored in the auxiliary-stream storing unit 23 as an auxiliary stream. The delivery control unit 24 sends the main stream stored in the main-stream storing unit 21 and the auxiliary stream stored in the auxiliary-stream storing unit 23 to the network 13 through the network interface 25.

The data sent arrives at the receiving apparatus 12 through the network 13 using IP multicast, a content delivery network, and the like.

The receiving apparatus 12 includes a remote-controller receiving unit 31, a speaker 32, a display 33, an inter-stream-error storing unit 34, a data processing unit 35, a scene detecting unit 36, a main stream buffer 37, an auxiliary stream buffer 38, a main-stream-reception control unit 39, an auxiliary-stream-reception control unit 40, and a network interface 41.

The receiving apparatus 12 receives a stream in the network interface 41. When the stream is an auxiliary stream, the auxiliary-stream-reception control unit 40 records the auxiliary stream in the auxiliary stream buffer 38. When the stream is a main stream, the main-stream-reception control unit 39 records the main stream in the main stream buffer 37.

The data processing unit 35 applies decoding processing, decompression processing, video processing suitable for a display, and the like to data of the stream and reproduces the data in the display 33 and the speaker 32. An output of the data processing unit 35 is inputted to the scene detecting unit 36. The scene detecting unit 36 detects whether a CM (commercial) has begun, for example, and applies a trigger to the auxiliary-stream-reception control unit 40 to start reception of the auxiliary stream. The auxiliary-stream-reception control unit 40 applies buffering to the auxiliary stream buffer 38 prior to tuning operation that is highly likely to be performed by the user when a CM has begun.

On the other hand, separately from the series of operations, the data processing unit 35 judges an error between scenes of a main stream and an auxiliary stream, which are provided from a streaming broadcasting station therefor, on the basis of a value designating display time of each of screens in compressed data such as a PTS (Presentation Time Stamp) in MPEG-2 and records the error in the inter-stream-error storing unit 34.

When the remote-controller receiving unit 31 receives tuning operation by the user, the main-stream-reception control unit 39 starts reception of a main stream of a tuned broadcast. At the same time, the main-stream-reception control unit 39 selects, from data of an auxiliary stream of the tuned broadcast recorded in the auxiliary stream buffer 38, data at such a time that the auxiliary stream is possible to be switched to a main stream without shift of scenes when the auxiliary stream is switched to the main stream later, taking into account the error recorded in the inter-stream-error storing unit 34. The main-stream-reception control unit 39 transfers the data to the data processing unit 35 and reproduces the data using the display 33 and the speaker 32 to realize high-speed tuning operation.

When buffering for a requested main stream is completed, in the same manner, the main-stream-reception control unit 39 transfers data of the main stream from the main stream buffer 37 to the data processing unit 35 and switches the auxiliary stream displayed to video and sound of the main stream.

Figure 6:
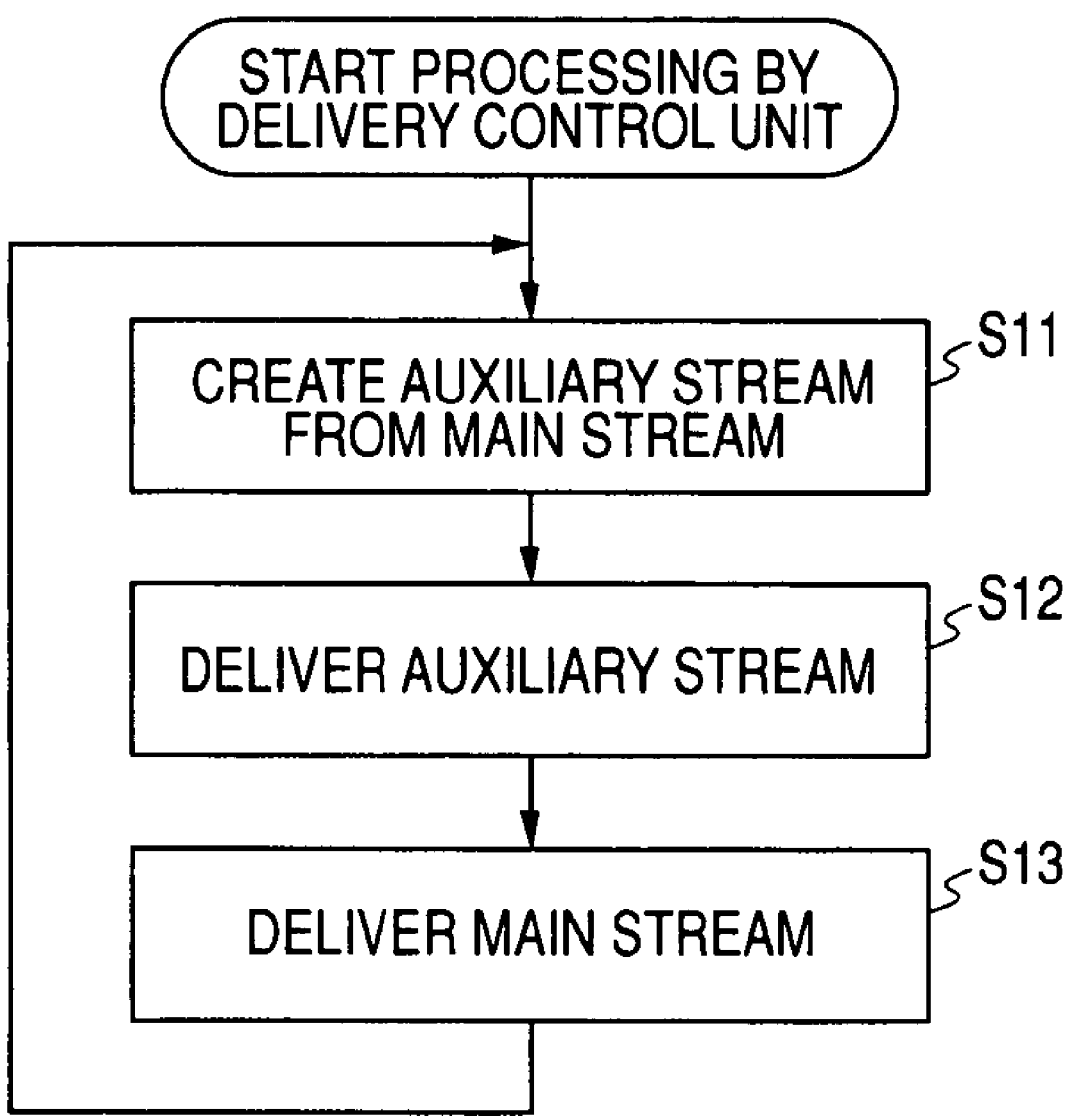
FIG. 6 is a flowchart for explaining processing by a delivery control unit in the transmitting apparatus.
Figure 7:
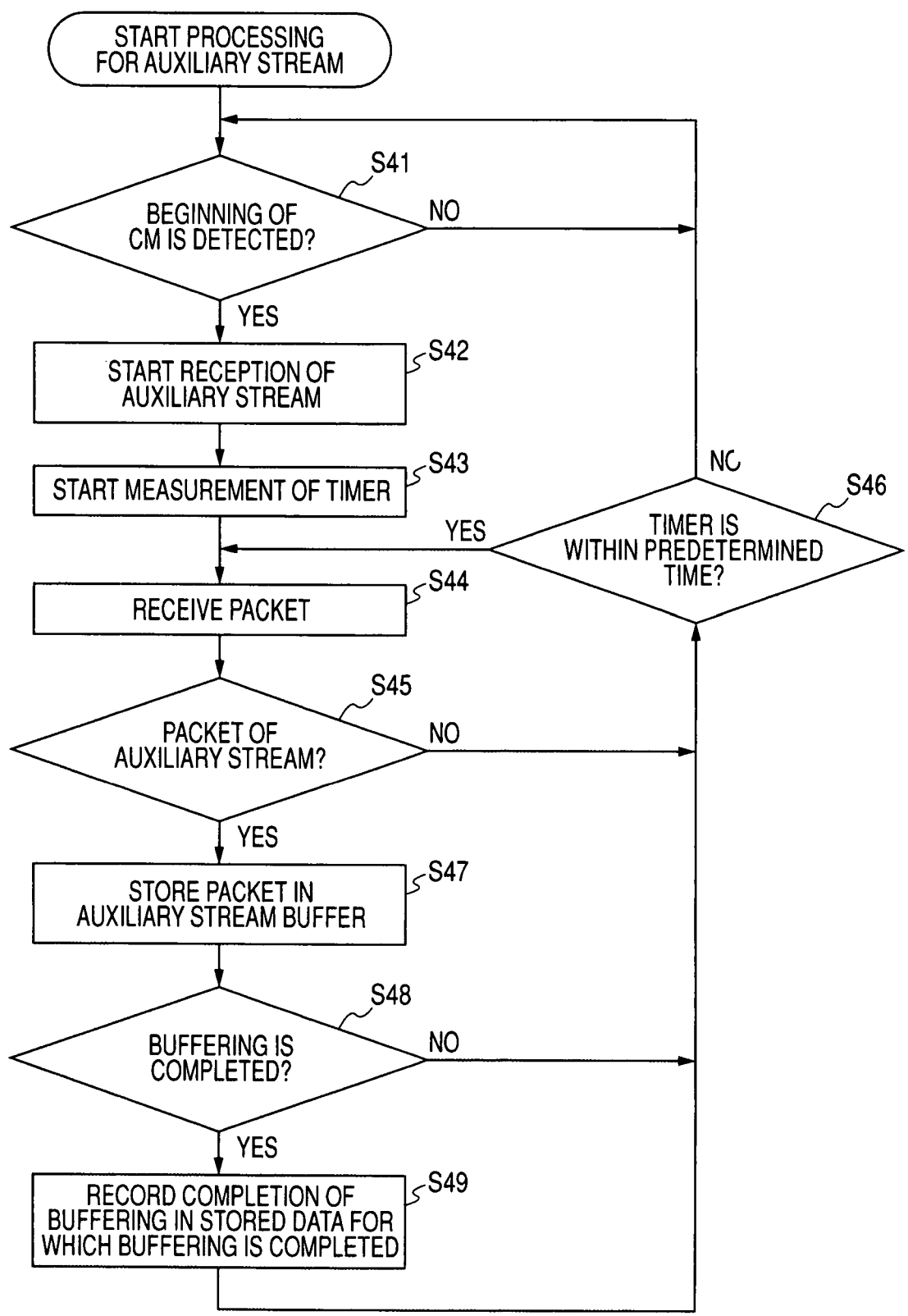
FIG. 7 is a flowchart for explaining processing for an auxiliary-stream-reception control unit in the receiving apparatus.
Figure 8:
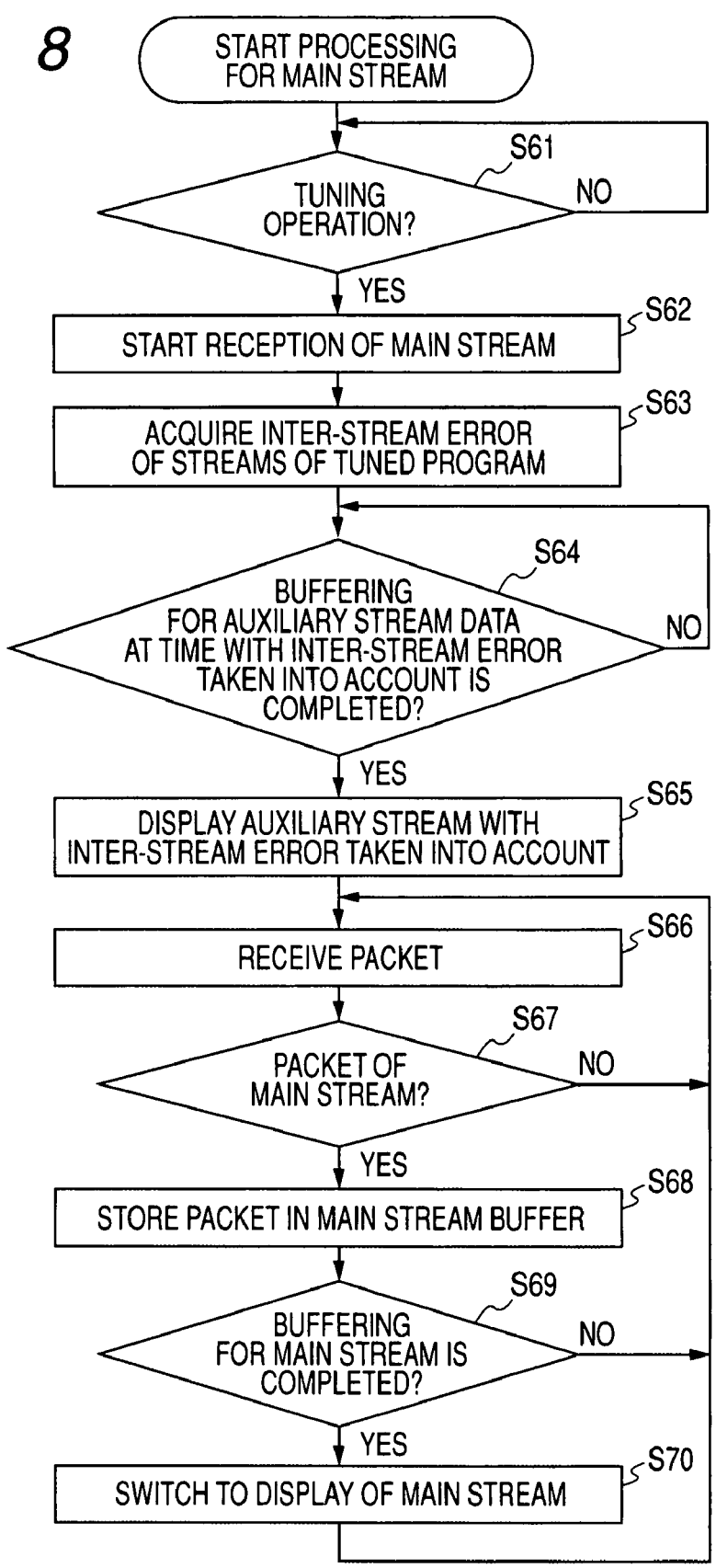
FIG. 8 is a flowchart for explaining processing for a main-stream-reception control unit in the receiving apparatus.

A flowchart of operations of the delivery control unit 24 of the transmitting apparatus 11 shown in FIG. 5 is shown in FIG. 6. A flowchart of operations of the auxiliary-stream-reception control unit 40 of the receiving apparatus 12 is shown in FIG. 7. A flowchart of operations of the main-stream-reception control unit 39 of the receiving apparatus 12 is shown in FIG. 8. The operations of the respective units will be explained with reference to the flowcharts.

First, in step S11 in the flowchart of the operations of the delivery control unit 24 of the transmitting apparatus 11 in FIG. 6, the bit-rate-reducing converting unit 22 creates an auxiliary stream using a fixed amount of data of the main stream stored in the main-stream storing unit 21 and causes the auxiliary-stream storing unit 22 to store the auxiliary stream.

In step S12, the delivery control unit 24 delivers the auxiliary stream stored in the auxiliary-stream storing unit 23 from the network interface 25. In step S13, the delivery control unit 24 delivers the main stream stored in the main-stream storing unit 21 from the network interface 25. The processing in steps S11 to S13 is repeated. Consequently, the main stream or the auxiliary stream is transmitted from the transmitting apparatus 11 to the receiving apparatus 12.

Operations of the auxiliary-stream-reception control unit 40 of the receiving apparatus 12 will be explained with reference to the flowchart in FIG. 7.

In step S41, the auxiliary-stream-reception control unit 40 performs a loop to be on standby until it is detected that a CM has begun. When the CM has begun, it is detected in step S41 that the CM has begun and the processing proceeds to step S42. In step S42, the auxiliary-stream-reception control unit 40 requests the transmitting apparatus 11 to delivery an auxiliary stream (e.g., in the case of unicast) or participates in a multicast group in which the auxiliary stream is delivered (e.g., in the case of multicast) and starts reception of the auxiliary stream. In step S43, the auxiliary-stream-reception control unit 40 starts measurement using a timer in order to end the reception in a fixed time.

When a packet is received in step S44, in step S45, the auxiliary-stream-reception control unit 40 judges whether the packet received is a packet of the auxiliary stream. When it is judged in step S45 that the packet received is not a packet of the auxiliary stream, the processing proceeds to step S46. The auxiliary-stream-reception control unit 40 judges whether the time is within a predetermined time and judges whether the next packet should be received. When it is judged in step S46 that the next packet should be received, the processing returns to step S44 and the processing in step S44 and the subsequent steps is repeated. On the other hand, when it is judged in step S46 that the next packet should not be received, the processing returns to step S41 and the auxiliary-stream-reception control unit 40 is returned to the state of standby for detection of a CM.

On the other hand, when it is judged in step S45 that the packet received is a packet of the auxiliary stream, the processing proceeds to step S47 and the auxiliary-stream-reception control unit 40 stores the packet received in the auxiliary stream buffer 38. In step S48, the auxiliary-stream-reception control unit 40 judges whether buffering for displaying data received before data of the packet is completed according to arrival of the data of the packet. When it is judged in step S48 that the buffering is not completed, the processing returns to step S46 and the processing in step S46 and the subsequent steps is repeated.

On the other hand, when it is judge in step S48 that the buffering is completed, the processing proceeds to step S49. The completion of the buffering is recorded in the data for which the buffering is completed. The processing returns to the check of the timer, i.e., step S46 and the processing in step S46 and the subsequent steps is repeated.

In this way, the auxiliary stream is recorded in the auxiliary stream buffer 38.

Operations of the main-stream-reception control unit 39 of the receiving apparatus 12 will be explained with reference to the flowchart in FIG. 8.

In step S61, the main-stream-reception control unit 39 performs a loop to be on standby until tuning operation is performed. When the tuning operation is performed, in step S62, the main-stream-reception control unit 39 requests the transmitting apparatus 11 to deliver a main stream of a tuned broadcast or participates in a multicast group in which the main stream is delivered and starts reception of the main stream. In step S63, the main-stream-reception control unit 39 acquires an inter-stream error between the main stream and an auxiliary stream of the tuned broadcast from the inter-stream-error storing unit 34. The main-stream-reception control unit 39 selects, on the basis of the inter-stream error, data of the auxiliary stream in which shift of scenes does not occur when the auxiliary stream is switched to the main stream. In step S64, the main-stream-reception control unit 39 judges whether buffering for the data is completed.

When it is judged in step S64 that the buffering for the data of the auxiliary stream is not completed, the processing in step S64 is performed until the buffering is completed. When the buffering is completed, in step S65, the main-stream-reception control unit 39 starts display of the auxiliary stream from the data of the auxiliary stream.

Moreover, in step S66, the main-stream-reception control unit 39 receives a packet. In step S67, the main-stream-reception control unit 39 judges whether the packet received is a packet of the main stream. When it is judged in step S67 that the packet received is not a packet of the main stream, the processing returns to step S66 and the processing in step S66 and the subsequent steps is repeated.

On the other hand, when it is judged in step S67 that the packet received is a packet of the main stream, the processing proceeds to step S68. In step S68, the main-stream-reception control unit 39 stores the packet received in the main stream buffer 37. In step S69, the main-stream-reception control unit 39 judges whether buffering for the main stream is completed. When it is judged that the buffering for the main stream is not completed, the processing returns to step S66 and reception of a packet is continued.

On the other hand, when it is judged in step S69 that the buffering for the main stream is completed, in step S70, the main-stream-reception control unit 39 switches display from the auxiliary stream to the main stream not to cause shift of scenes. The processing returns to step S66 and reception of a packet is continued.

In this way, on the reception side, when the tuning operation is performed, display by the auxiliary stream is performed and then display by the main stream is performed. This makes it possible to reduce time during which an image is not provided to the user at the time of tuning.

As described above, in step S70, the main-stream-reception control unit 39 switches display from the auxiliary stream to the main stream not to cause shift of scenes. The switching is realized by displaying the auxiliary stream with the inter-stream error taken into account in step S65. For example, when the inter-stream error is three seconds, it is possible to absorb shift of scenes for three seconds if an auxiliary stream three seconds before an auxiliary stream usually displayed is acquired and displayed.

Moreover, when it is difficult to acquire an auxiliary stream sufficient for absorbing shift of scenes or when extremely short shift of scenes is absorbed, the shift of scenes may be absorbed by extending display time of a picture in the auxiliary stream. A mechanism for absorbing shift of scenes at the time of switching the auxiliary stream to the main stream may be further provided. The mechanism absorbs the shift of scenes by adjusting a display time of a picture (e.g., the picture 12 or the picture 13 in FIG. 4) at a point before a first picture (e.g., the picture 15 in FIG. 4) of the main stream at the time when the auxiliary stream is switched to the main stream.

Second Embodiment

Figure 9:
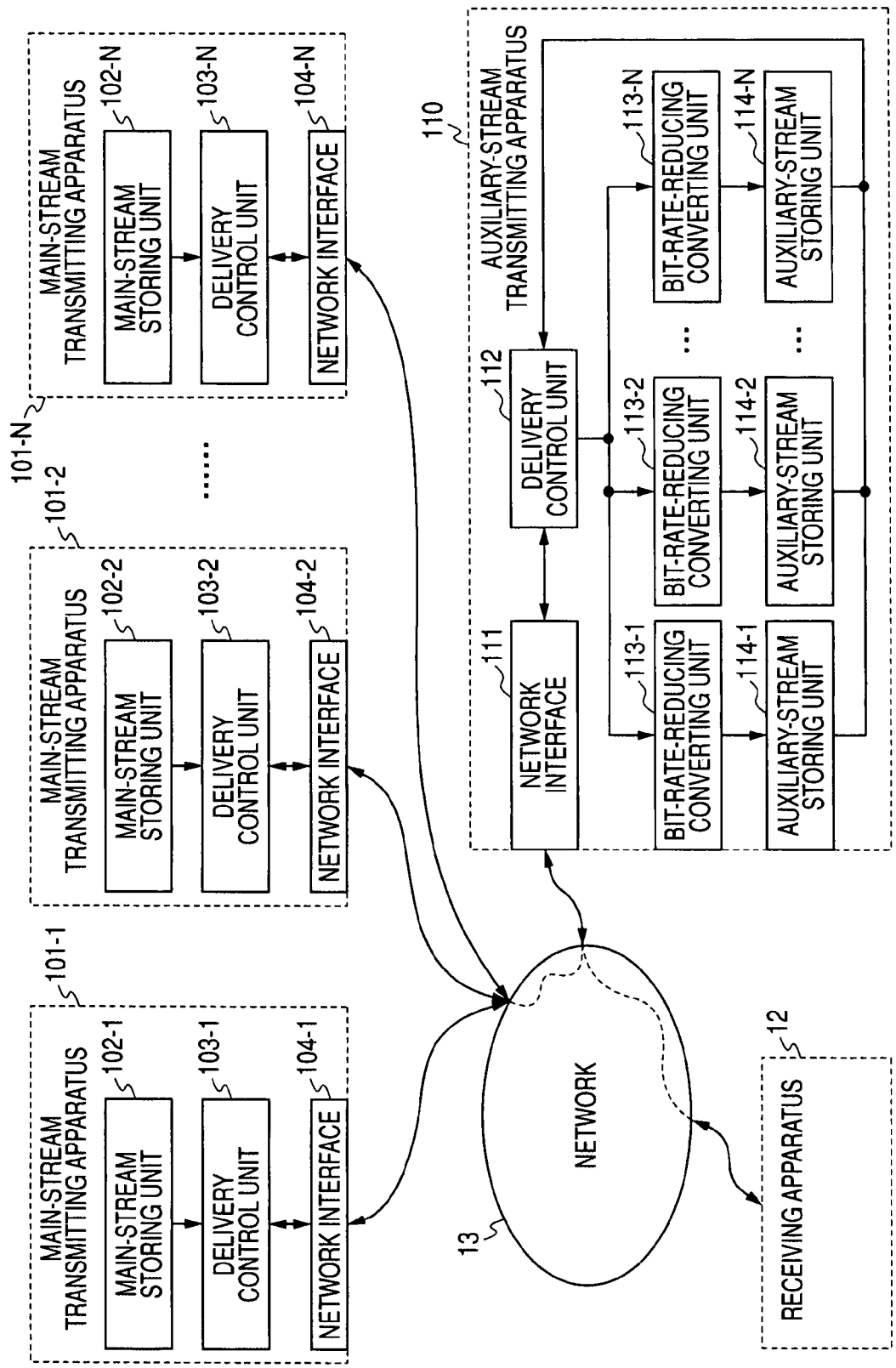
FIG. 9 is a diagram showing another transmitting apparatus according to an embodiment of the invention.

FIG. 9 is a diagram showing an example of a structure of another system according to a second embodiment of the invention. The system shown in FIG. 9 is different from the system shown in FIG. 5 in that, whereas the transmitting apparatus 11 transmits a main stream and an auxiliary stream in the system shown in FIG. 5, a main stream and an auxiliary stream are transmitted from different apparatuses in the system shown in FIG. 9.

Specifically, the system shown in FIG. 9 includes main-stream transmitting apparatuses 101-1 to 101-N and an auxiliary-stream transmitting apparatus 110. It is possible to apply the receiving apparatus 12 of the system shown in FIG. 5 to the system shown in FIG. 9. Thus, an example of a detailed structure of the receiving apparatus 12 is not shown in FIG. 9. The network 13 is also the same as the network 13 shown in FIG. 5.

The main-stream transmitting apparatus 101-1 includes a main-stream storing unit 102-1, a delivery control unit 103-1, and a network interface 104-1. The main-stream transmitting apparatuses 101-2 to 101-N have the same structure as the main-stream transmitting apparatus 101-1. Thus, an explanation of the main-stream transmitting apparatuses 101-2 to 101-N is omitted.

The main-stream storing unit 102-1 of the main-stream transmitting apparatus 101 stores a main stream in the same manner as the main-stream storing unit 21 of the transmitting apparatus 11 in FIG. 5. The delivery control unit 103-1 of the main-stream transmitting apparatus 101 performs delivery control for the main stream in the same manner as the delivery control unit 24 of the transmitting apparatus 11 in FIG. 5. The network interface 104-1 of the main-stream transmitting apparatus 101 controls exchange of data via the network 13 in the same manner as the network interface 25 of the transmitting apparatus 11 in FIG. 5.

The auxiliary-stream transmitting apparatus 110 includes a network interface 111, a delivery control unit 112, bit-rate-reducing converting units 113-1 to 113-N, and auxiliary-stream storing units 114-1 to 114-N. The bit-rate-reducing converting units 113-1 to 113-N convert main streams from the main-stream transmitting apparatuses 101-1 to 101-N into auxiliary streams of a low bit rate, respectively. The auxiliary-stream storing units 114-1 to 114-N stores the auxiliary streams from the bit-rate-reducing converting units 113-1 to 113-N, respectively.

The network interface 111 of the auxiliary-stream transmitting apparatus 110 controls exchange of data via the network 13 in the same manner as the network interface 25 of the transmitting apparatus 11. The delivery control unit 112 of the auxiliary-stream transmitting apparatus 110 performs delivery control for an auxiliary stream in the same manner as the delivery control unit 24 of the transmitting apparatus 11. Each of the bit-rate-reducing converting units 113-1 to 113-N of the auxiliary-stream transmitting apparatus 110 generates an auxiliary stream from a main stream in the same manner as the bit-rate-reducing converting unit 22 of the transmitting apparatus 11. The auxiliary-stream storing units 114-1 to 114-N of the auxiliary-stream transmitting apparatus 110 store auxiliary streams in the same manner as the auxiliary-stream storing unit 23 of the transmitting apparatus 11.

In the main-stream transmitting apparatuses 101-1 to 101-N, only main streams are stored in the main-stream storing units 102-1 to 102-N. The delivery control units 103-1 to 103-N deliver the main streams to the network 13 through the network interfaces 104-1 to 104-N in response to a delivery request.

The auxiliary-stream transmitting apparatus 110 receives the main streams from the main-stream transmitting apparatuses 101-1 to 101-N serving as streaming broadcasting stations from the network interface 111. The auxiliary-stream transmitting apparatus 110 reduces bit rates of the main streams using the bit-rate-reducing converting units 113-1 to 113-N and stores the main streams in the auxiliary-stream storing units 114-1 to 114-N, respectively. The delivery control unit 112 controls the network interface 111 to send the main streams in response to a delivery request.

In this embodiment, the receiving apparatus 12 can receive, from the auxiliary-stream transmitting apparatus 110 that collectively provides auxiliary streams, provision of an auxiliary stream separately from the streaming broadcasting stations. Thus, it is possible to use the auxiliary stream even when the streaming broadcasting stations do not provide auxiliary streams.

Operations of each of the main-stream transmitting apparatuses 101-1 to 101-N are operations for storing a main stream in each of the main-stream storing units 102-1 to 102-N and delivering the main stream stored to the auxiliary-stream transmitting apparatus 110. Each of the main-stream transmitting apparatuses 101-1 to 101-N also delivers the main stream to the receiving apparatus 12.

Operations of the auxiliary-stream transmitting apparatus 110 are operations for reducing a bit rate of a main stream delivered from each of the main-stream transmitting apparatuses 101-1 to 101-N in each of the bit-rate-reducing converting unit 113-1 to 113-N, i.e., creating an auxiliary stream, and storing the auxiliary stream created in each of the auxiliary-stream storing units 114-1 to 114-N. The auxiliary-stream transmitting apparatus 110 also delivers the auxiliary stream to the receiving apparatus 12.

Such operations of each of the main-stream transmitting apparatuses 101-1 to 101-N and operations of the auxiliary-stream transmitting apparatus 110 mean that the processing of the flowchart in FIG. 6 is shared by the respective apparatuses. Thus, a detailed explanation of the operations is omitted.

Third Embodiment

According to a third embodiment of the invention, the transmitting apparatus 11 that delivers both a main stream and an auxiliary stream as in the first embodiment and the main-stream transmitting apparatuses 101-1 to 101-N and the auxiliary-stream transmitting apparatus 110 that deliver main streams and an auxiliary stream independently from one another as in the second embodiment may be mixed.

Fourth Embodiment

According to a fourth embodiment of the invention, since an auxiliary stream is data with a bit rate reduced, no load is imposed on a transmission path. Thus, the auxiliary stream may be received always on the receiving apparatus 13 side. Tuning operation by a user may be forecasted using means for, for example, detecting the beginning of a CM in a program presently being viewed to start reception of the auxiliary stream. In the latter case, since the auxiliary stream does not always have to be received, it is possible to reduce a network band occupied by the auxiliary stream received.

Fifth Embodiment

As an auxiliary stream received prior to tuning, all programs may be received or only an auxiliary stream of a program expected to be tuned in next from a program presently being viewed such as a program designated by an up/down key operated at the time of tuning may be received. In the latter case, it is possible to reduce a network band occupied by the auxiliary stream received.

Sixth Embodiment

In the receiving apparatus 12, when tuning operation is performed, reception of a main stream may be started simultaneously with the tuning operation or at a point after the tuning operation. As a UI (User Interface) for providing the tuning operation, in some cases, auxiliary streams of plural broadcasts to be tuned in are simultaneously displayed on a screen as indicated by an example of a screen shown in FIG. 10 (images of six programs, i.e., auxiliary stream programs 1 to 6, are displayed in the example of the screen shown in FIG. 10), a selection frame 131, an arrow (not shown), or the like pointing a tuned program candidate out of the auxiliary streams is set on an image of a program of an auxiliary stream to be tuned in, and the tuned program is decided by a determination button or the like.

In such a case, reception of the main stream may be started with the setting of the frame or the arrow indicating a tuned program candidate on the auxiliary stream as a trigger without waiting for tuning by the determination button. In this case, it is possible to switch the auxiliary stream to the main stream at an earlier stage.

Seventh Embodiment

In the cases of the second embodiment and the sixth embodiment, one stream obtained by collecting plural auxiliary streams may be provided as an auxiliary stream. Consequently, when viewable programs are limited for each of regions, it is possible to limit a broadcast on the transmission side rather than selecting a broadcast on the receiving apparatus 12 side.

In all the first to the seventh embodiments, in changing a broadcast program in the streaming broadcast, an auxiliary stream with a reduced bit rate is received prior to changing operation, the auxiliary stream is displayed immediately after the change, and display is switched when buffering for a main stream is completed. As a result, the following effects are obtained.

Since it is unnecessary to wait for an I picture and buffering for the main stream, it is possible to instantaneously switch the streaming broadcast and limitlessly reduce a tuning time of the streaming broadcast.

By reducing the tuning time, it is possible to prevent a user from feeling uneasiness about failure or the like in a long tuning waiting time and provide the user with a viewing form in which the user tunes in and selects various programs without feeling stress.

Moreover, since the tuning waiting time is reduced, the user less easily suffers network failure such as temporary suspension of a broadcast being displayed due to unreasonable reduction of buffering. It is possible to prevent the user from being embarrassed and feeling uneasiness because of temporary suspension of a broadcast by performing sufficient buffering while the auxiliary stream is displayed and preventing the user from easily suffering network failure.

It should be understood by those skilled in the art that various modifications, combinations, sub-combinations, and alterations may occur depending on design requirements and other factors insofar as they are within the scope of the appended claims or the equivalents thereof.

What is claimed is:

1. A transmitting and receiving system comprising:
   a transmitting apparatus that delivers a main stream for performing a streaming broadcast and an auxiliary stream generated from the main stream; and
   a receiving apparatus that receives the main stream and the auxiliary stream from the transmitting apparatus, wherein
   the transmitting apparatus includes:
   a main-stream storing component configured to store the main stream;
   a bit-rate-reducing converting component configured to reduce a bit rate of the main stream to generate an auxiliary stream;
   an auxiliary-stream storing component configured to store the auxiliary stream; and
   a delivery control component configured to perform control for delivering the main stream stored in the main-stream storing component and the auxiliary stream stored in the auxiliary-stream storing component to a network through a network interface, the receiving apparatus includes:
> a main-stream-reception control component configured to control reception of the main stream and storage of the main stream in a buffer;
> an auxiliary-stream-reception control component configured to control reception of the auxiliary stream and storage of the auxiliary stream in a buffer;
> a data processing component configured to perform decoding processing, decompression processing, and video processing for the main stream and the auxiliary stream; and
> an inter-stream-error storing component configured to judge an error between scenes of the main stream and the auxiliary stream on the basis of a value designating display time of each of screens and storing the error, and when tuning operation by a user is received, the main-stream-reception control component selects, from data of an auxiliary stream of a tuned broadcast, reception and storage of which are controlled by the auxiliary-stream-reception control component, data at such a time that the auxiliary stream is possible to be switched to a main stream without shift of scenes when the auxiliary stream is switched to the main stream later, taking into account the error stored in the inter-stream-error storing component, and supplies the data to the data processing component.

2. A transmitting and receiving system comprising:
a transmitting apparatus that delivers a main stream for performing a streaming broadcast and an auxiliary stream generated from the main stream; and
a receiving apparatus that receives the main stream and the auxiliary stream from the transmitting apparatus, wherein
the transmitting apparatus includes:
> a main-stream storing unit storing the main stream;
> a bit-rate-reducing converting unit reducing a bit rate of the main stream to generate an auxiliary stream;
> an auxiliary-stream storing unit storing the auxiliary stream; and
> a delivery control unit performing control for delivering the main stream stored in the main-stream storing unit and the auxiliary stream stored in the auxiliary-stream storing unit to a network through a network interface, the receiving apparatus includes:
> a main-stream-reception control unit controlling reception of the main stream and storage of the main stream in a buffer;
> an auxiliary-stream-reception control unit controlling reception of the auxiliary stream and storage of the auxiliary stream in a buffer;
> a data processing unit performing decoding processing, decompression processing, and video processing for the main stream and the auxiliary stream; and
> an inter-stream-error storing unit judging an error between scenes of the main stream and the auxiliary stream on the basis of a value designating display time of each of screens and storing the error, and when tuning operation by a user is received, the main-stream-reception control unit selects, from data of an auxiliary stream of a tuned broadcast, reception and storage of which are controlled by the auxiliary-stream-reception control unit, data at such a time that the auxiliary stream is possible to be switched to a main stream without shift of scenes when the auxiliary stream is switched to the main stream later, taking into account the error stored in the inter-stream-error storing unit, and supplies the data to the data processing unit.

3. A transmitting and receiving system comprising:
a first transmitting apparatus that delivers a main stream for performing a streaming broadcast;
a second transmitting apparatus that delivers an auxiliary stream generated from the main stream; and
a receiving apparatus that receives the main stream from the first transmitting apparatus and the auxiliary stream from the second transmitting apparatus, wherein
the first transmitting apparatus includes:
> a main-stream storing component configured to store the main stream; and
> a main-stream-delivery control component configured to perform control for delivering the main stream stored in the main-stream storing component to a network through a network interface, the second transmitting apparatus includes:
> a bit-rate-reducing converting component configured to receive the main stream, reduce a bit rate of the main stream, and generate an auxiliary stream,
> an auxiliary-stream storing component configured to store the auxiliary stream; and
> an auxiliary-stream-delivery control component configured to perform control for delivering the auxiliary stream stored in the auxiliary-stream storing component to the network through a network interface, the receiving apparatus includes:
> a main-stream-reception control component configured to control reception of the main stream and storage of the main stream in a buffer;
> an auxiliary-stream-reception control component configured to control reception of the auxiliary stream and storage of the auxiliary stream in the buffer;
> a data processing component configured to perform decoding processing, decompression processing, and video processing for the main stream and the auxiliary stream; and
> an inter-stream-error storing component configured to judge an error between scenes of the main stream and the auxiliary stream on the basis of a value designating display time of each of screens and storing the error, and when tuning operation by a user is received, the main-stream-reception control component selects, from data of an auxiliary stream of a tuned broadcast, reception and storage of which are controlled by the auxiliary-stream-reception control component, data at such a time that the auxiliary stream is possible to be switched to a main stream without shift of scenes when the auxiliary stream is switched to the main stream later, taking into account the error stored in the inter-stream-error storing component, and supplies the data to the data processing component.

4. A transmitting and receiving system comprising:
a first transmitting apparatus that delivers a main stream for performing a streaming broadcast;
a second transmitting apparatus that delivers an auxiliary stream generated from the main stream; and
a receiving apparatus that receives the main stream from the first transmitting apparatus and the auxiliary stream from the second transmitting apparatus, wherein the first transmitting apparatus includes:
- a main-stream storing unit storing the main stream; and
- a main-stream-delivery control unit performing control for delivering the main stream stored in the main-stream storing unit to a network through a network interface, the second transmitting apparatus includes:
- a bit-rate-reducing converting unit receiving the main stream, reducing a bit rate of the main stream, and generating an auxiliary stream,
- an auxiliary-stream storing unit storing the auxiliary stream; and
- an auxiliary-stream-delivery control unit performing control for delivering the auxiliary stream stored in the auxiliary-stream storing unit to the network through a network interface, the receiving apparatus includes:
- a main-stream-reception control unit controlling reception of the main stream and storage of the main stream in a buffer;
- an auxiliary-stream-reception control unit controlling reception of the auxiliary stream and storage of the auxiliary stream in the buffer;
- a data processing unit performing decoding processing, decompression processing, and video processing for the main stream and the auxiliary stream; and
- an inter-stream-error storing unit judging an error between scenes of the main stream and the auxiliary stream on the basis of a value designating display time of each of screens and storing the error, and when tuning operation by a user is received, the main-stream-reception control unit selects, from data of an auxiliary stream of a tuned broadcast, reception and storage of which are controlled by the auxiliary-stream-reception control unit, data at such a time that the auxiliary stream is possible to be switched to a main stream without shift of scenes when the auxiliary stream is switched to the main stream later, taking into account the error stored in the inter-stream-error storing unit, and supplies the data to the data processing unit.

* * * * *